Figure 1:
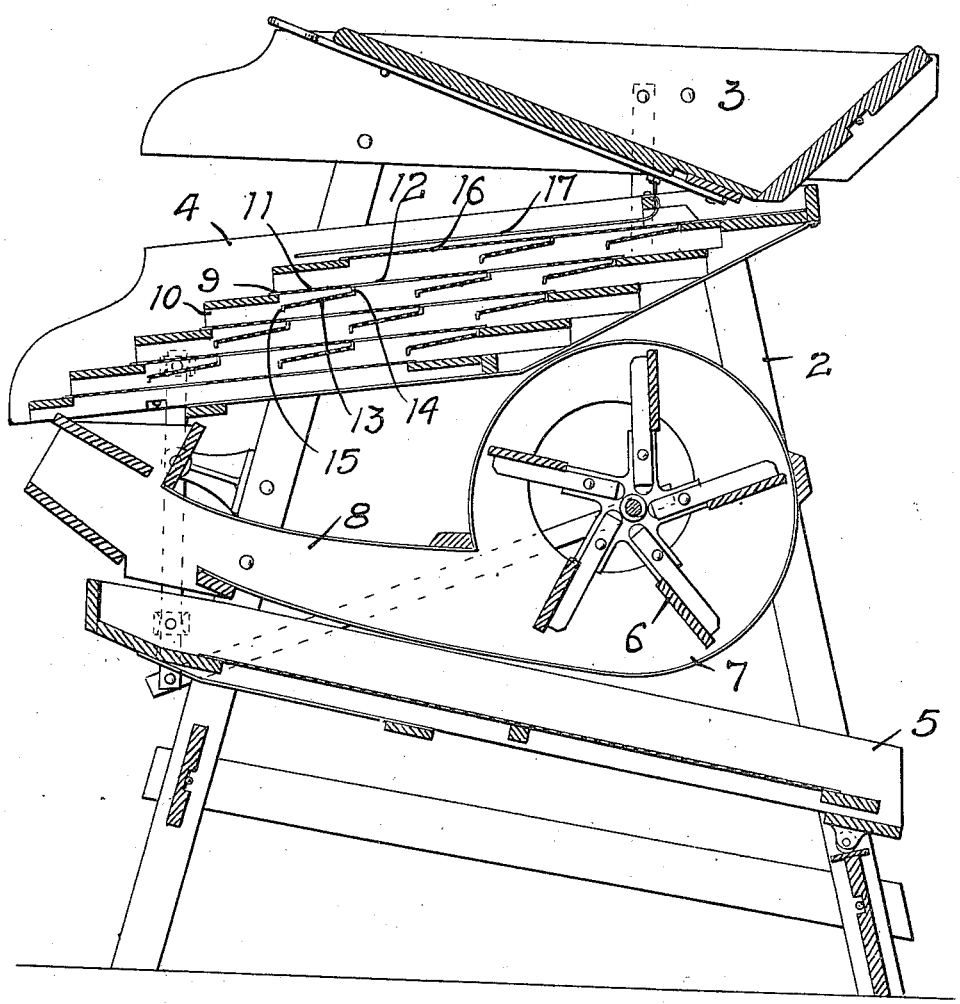

R. L. OWENS.
GRAIN SEPARATOR.
APPLICATION FILED NOV. 11, 1908.

964,307.

Patented July 12, 1910.
2 SHEETS—SHEET 1.

WITNESSES

INVENTOR
RICHARD L. OWENS
BY Paul & Paul
HIS ATTORNEYS

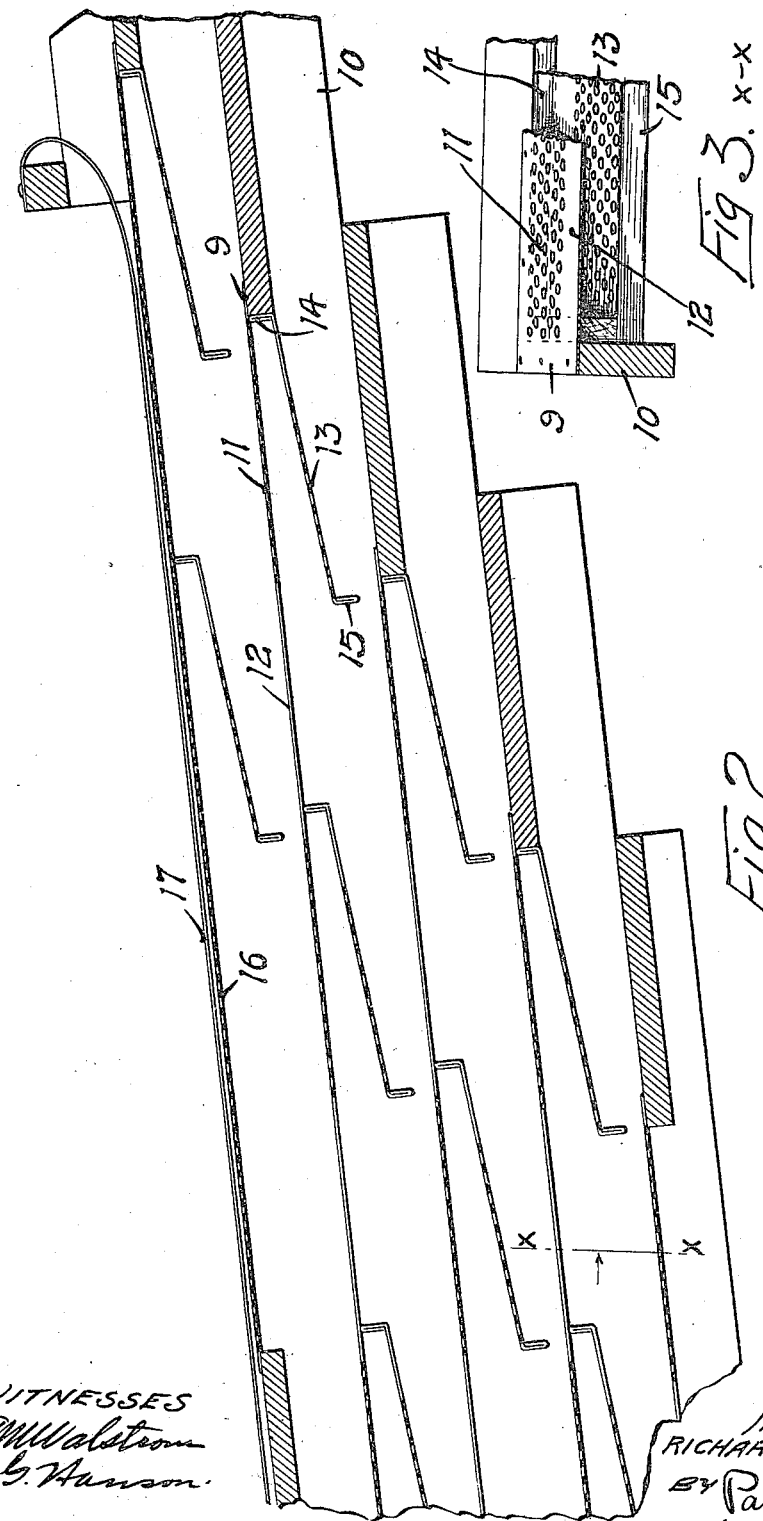

UNITED STATES PATENT OFFICE.

RICHARD L. OWENS, OF MINNEAPOLIS, MINNESOTA, ASSIGNOR TO J. L. OWENS MANUFACTURING COMPANY, OF MINNEAPOLIS, MINNESOTA, A CORPORATION OF MINNESOTA.

GRAIN-SEPARATOR.

964,307. Specification of Letters Patent. Patented July 12, 1910.

Application filed November 11, 1908. Serial No. 462,010.

*To all whom it may concern:*

Be it known that I, RICHARD L. OWENS, of Minneapolis, Hennepin county, Minnesota, have invented certain new and useful Improvements in Grain-Separators, of which the following is a specification.

This invention relates to improvements in grain separators of the type usually known as fanning mills, and the object of the invention is to provide a grain separator sieve especially adapted for separating oats from wheat, though capable of being used for separating other grains or seeds.

The invention consists generally in a sieve provided with alternating sections of perforate and imperforate material and auxiliary sections of perforate material arranged beneath said first named perforate sections as claimed.

The invention consists further in the constructions and combinations hereinafter described and particularly pointed out in the claims.

In the accompanying drawings, forming part of this specification; Figure 1 is a longitudinal, vertical section of a fanning mill having my invention embodied therein. Fig. 2 is an enlarged section of a portion of a series of sieves constructed in accordance with my invention. Fig. 3 is a detail section on line $x$—$x$ of Fig. 2.

In the drawings, 2 represents the frame of a fanning mill provided with a suitable hopper 3, an upper vibratory shoe 4, a lower shoe 5, a fan 6, a fan casing 7 and windtrunk 8. These parts may all be of any preferred construction, and I do not limit myself to any particular arrangement of the operative parts of the mill.

9 represents a sieve provided with a suitable frame 10 and preferably composed of a plate of sheet metal secured to the frame and provided with a series of perforate sections 11 and an alternating series of imperforate sections 12. Secured to the sieve frame and arranged below each perforate section 11, is a perforate section 13, preferably arranged at a greater inclination than the plate of sheet metal containing the perforate sections 11. I prefer to provide each of the sections 13, at its upper edge, with an upturned lip 14 that extends to the under surface of the main sieve just above the perforate section 11 and to provide the lower edge of said section with a depending lip 15, which is arranged over the lower part of the imperforate section 12 of the main sieve (see Fig. 2).

I prefer to provide a series of sieves 9 and to arrange them in the shoe 4, as shown in the drawings; that is to say, with the perforate sections of the one sieve over the imperforate sections of the next sieve below and so on throughout the series, using as many of said sieves as may be necessary or desirable.

I prefer to provide in the shoe an upper sieve 16 that is perforate throughout its entire length and upon this sieve I prefer to provide a flexible rider or apron 17, which holds the grain flat that is passing over this sieve, and I also prefer to provide, under this sieve, two auxiliary perforate sections 13, as shown in Fig. 1 of the drawings.

Operation: In using this device for separating oats from wheat, the grain is fed through the hopper and passes downward over the upper sieve beneath the rider or apron 17. Practically all of the wheat and considerable of the oats will be passed through this sieve. A portion of the oats will be separated from the wheat and will be carried over the tail of the sieve. The wheat and oats that fall upon the upper surface of the auxiliary perforate sections 13 will be subjected to a further separating action on these sections and the wheat passing therethrough, while the oats will be "skidded" along rapidly toward the tail of the machine. The auxiliary sections 13 being arranged at a greater inclination than the sections of the main sieve, will, in each instance, accelerate the forward movement of the oats, while permitting the wheat to pass therethrough and the oats will be rapidly moved or "skidded" toward the tail of the machine whenever they fall upon one of the auxiliary sections 13. It will be noted that in each instance after passing through the upper sieve, the falling grain will either strike an imperforate section 12 of the main sieve, or, if it strikes one of the perforate sections 11, there will be always an auxiliary section 13 below the perforate section 11 to take care of any of the oats, should any there be, that falls end first and passes through the holes in the sieve section 11.

It will be noted that by having the auxiliary sections 13 short and independent of one another, the oats falling upon their upper surfaces will pass downward over the sieve surface, while the wheat passes through the perforations in said auxiliary sections. This will bring the oats on to the next sieve below in advance of the wheat, and as the oats travel more slowly over the sieve than the wheat does, the oats will tend to hold back the wheat as it passes over the perforate sections of the main sieves, thereby increasing the chances of the wheat passing through said sections. There is, therefore, a marked advantage in having the series of auxiliary short perforate sections arranged beneath the perforate sections of the sieve above and above the imperforate sections of the sieve below. This advantage could not be obtained from a structure in which the auxiliary sections wear in one piece and extended the full length of the main sieve.

I do not limit myself to any particular number of sieves, or any particular arrangement of operative parts of the fanning mills in which the sieves may be employed, nor do I limit myself to any particular inclination of the auxiliary sieve sections, or to any particular size of perforations, either in the main sieve or in the auxiliary sections.

I claim as my invention:

1. In a grain separator, the combination, with a series of inclined sieves arranged one above another and in parallel relation, each of said sieves having alternately arranged perforate and imperforate sections, with the imperforate section of each sieve arranged beneath the perforate section of the sieve above, of a separate auxiliary perforate sieve section arranged between the perforate section of each sieve and the imperforate section of the sieve below and each auxiliary sieve having a greater inclination than the sieves between which it is arranged, substantially as described.

2. In a grain separator, the combination with a grain sieve having a series of perforate and imperforate sections alternating with each other, of an inclined auxiliary perforate sieve section arranged beneath each perforate section and at an angle thereto and having its head and tail ends substantially in vertical alinement with the receiving and delivering ends of the perforate sections of the main sieve, substantially as described.

In witness whereof, I have hereunto set my hand this 20th day of October 1908.

RICHARD L. OWENS.

Witnesses:
C. G. HANSON,
J. A. BYINGTON.